United States Patent [19]

Brzostek

[11] 3,742,252

[45] June 26, 1973

[54] SIGNAL CONVERSION CIRCUIT
[75] Inventor: Richard Brzostek, Rockford, Ill.
[73] Assignee: Woodward Governor Company, Rockford, Ill.
[22] Filed: Jan. 6, 1972
[21] Appl. No.: 215,859

[52] U.S. Cl.............. 307/246, 307/251, 307/255, 320/1, 340/173 CA
[51] Int. Cl. .......................................... H03k 17/60
[58] Field of Search................. 307/246, 255, 251, 307/221 D; 320/1; 340/173 CA

[56] References Cited
UNITED STATES PATENTS

| 3,474,260 | 10/1969 | Frohbach | 307/221 D |
| 3,253,161 | 5/1966 | Owen | 307/246 |
| 3,443,190 | 5/1969 | Christiansen | 307/246 X |
| 3,521,141 | 7/1970 | Walton | 307/246 X |
| 3,546,490 | 12/1970 | Sangster | 307/221 D |

OTHER PUBLICATIONS
IBM Technical Disc. Vol. 13, No. 12, May, 1971 "Bucket Brigade Delay Line" by Heller.

Primary Examiner—John S. Heyman
Attorney—C. Frederick Leydig, Edward B. Holt, Leroy W. Mitchell et al.

[57] ABSTRACT

A circuit for producing successive pulses of equal charge content in response to successive cycles of an alternating input signal. A reference circuit supplied by a DC source establishes first, second and third voltages at successively higher DC levels. A capacitor referenced to the second DC level is selectively charged to the voltage at the third DC level during a first portion of each input cycle, while a load circuit referenced to the first voltage level is selectively controlled to provide a discharge path for the capacitor during a second portion of each input cycle, the respective voltage levels for the capacitor and the load circuit being such that the same amount of charge is transferred to the load circuit from the capacitor during each input cycle. In the preferred embodiment the load is a resistor-capacitor parallel combination so that the DC voltage developed across the load is proportional to the input frequency. Alternately, the load may be purely resistive or purely capacitive, in which case other characteristics of the load voltage vary in accordance with the frequency of the input signal.

12 Claims, 3 Drawing Figures

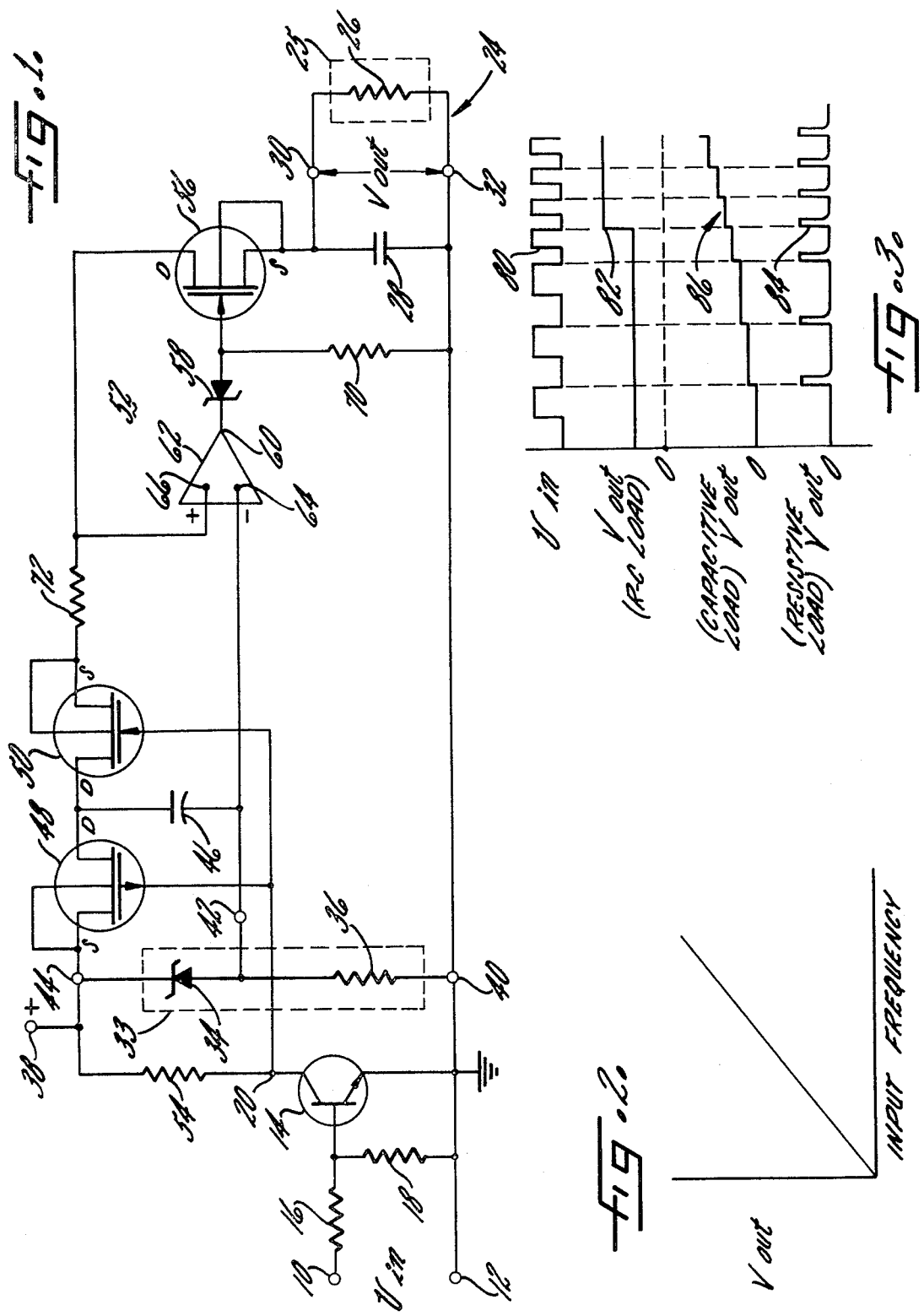

SIGNAL CONVERSION CIRCUIT

DESCRIPTION OF THE INVENTION

This invention relates generally to circuits for signal conversion and more particularly to a circuit for delivering a constant amount of charge during each cycle of an alternating input signal.

It is often desirable to obtain a voltage which varies in accordance with the frequency or speed of an alternating input signal. For example, in electronic speed control, an alternating signal is typically produced by a rotary transducer coupled to a shaft, in which case the signal consists of pulses having a repetition rate proportional to the angular velocity of the shaft. Since computing methods in speed control often require information in the form of DC voltage proportional to the actual speed, a conversion circuit is desirable.

A conventional method for producing a DC signal proportional to input frequency has been to trigger a single-shot multivibrator during each input cycle and to convert the output of the multivibrator into a DC signal with an averaging circuit. Since the output pulse from the one-shot theoretically is of a constant width and amplitude, the DC voltage developed is a measure of input frequency. However, conventional multivibrators employ bipolar transistor switches having junction and saturation characteristics which are inherently sensitive to temperature and power supply variations. Often elaborate and expensive circuit modifications and additions are used to provide compensation for these temperature and power supply variations.

The conversion circuit of the present invention is designed to overcome the drawbacks inherent in the aforementioned conventional conversion circuits.

It is a primary object of the present invention to provide a circuit which transfers a constant amount of charge to a load during each cycle of an input signal, the amount of charge transferred being independent of temperature and power supply variations.

Another object of the present invention is to provide a circuit for developing pulses having a charge magnitude which is entirely unrelated to the nature of the load.

Another object of the invention is to provide a circuit for transferring charge to a capacitive load during each cycle of an input signal so that the voltage across the load is proportional in magnitude to the number of input cycles occurring.

It is a still further object of the present invention to provide a signal conversion circuit in which unipolar electronic switching is employed.

Other objects and advantages of the invention will become apparent upon reading the following detailed description and upon reference to the drawings in which:

FIG. 1 is a schematic diagram of a signal conversion circuit constructed in accordance with the present invention.

FIG. 2 is a graph illustrating the operation of the circuit as a frequency-to-voltage converter.

FIG. 3 is a graph illustrating the timing relationships of various alternative electrical signals which can be obtained by utilizing different loads with the present invention.

While the invention will be described in connection with certain perferred embodiments, it will be understood that I do not intend to limit the invention to those embodiments. On the contrary, I intend to cover all alternatives, modifications and equivalents as may be included within the spirit and scope of the invention.

Turning first to FIG. 1, there is shown the conversion circuit of the present invention, the input portion of which includes a pair of terminals 10, 12 for receiving an input signal $V_{in}$ which alternates between first and second voltage levels. The input signal may, for example, be a periodic or non-periodic wave or pulse train from a rotary transducer or the like, or, alternatively, it may be a sinusoidal signal developed by an a-c. generator. The input signal $V_{in}$ is fed to the base of an NPN transistor 14 through a coupling or dropping resistor 16, the base of the transistor 14 being additionally referenced to ground through a resistor 18. The transistor 14 inverts, amplifies and shapes the input signal to produce a pulse signal at a control terminal 20 having sharply defined leading and trailing edges. The output portion of the circuit in the illustrated embodiment comprises an electrical load 24 consisting of a filtering capacitor 28 and a utilization device 25 represented by a resistor 26 connected across a pair of output terminals 30, 32. The signal developed across the load 24 is designated $V_{out}$.

In accordance with the present invention there is provided a reference control circuit 33 consisting of a zener diode 34 and a resistor 36 connected in series across a source of DC voltage represented by a ground terminal and a positive supply terminal 38. The reference control circuit provides first, second and third reference terminals 40, 42 and 44 respectively at successively higher and generally constant DC voltage levels. A charge accumulating device in the form of a capacitor 46 has one of its plates connected to the second reference terminal 42. First and second gating means in the form of field effect transistors 48, 50 respectively selectively (e.g., alternately) couple the other plate of the capacitor 46 (a) to the first reference terminal 44 and (b) to the load 24 in an alternating manner to be hereinafter described.

The field effect transistor 48 has its source (S) and drain (D) terminals respectively connected to the third reference terminal 44 and the capacitor 46, the gate terminal being controlled by the transistor 14 so that a charging path for the capacitor 46 is provided through the conduction channel of the transistor 48 when an appropriate DC voltage exists at the terminal 20. The field effect transistor 50 has its drain (D) and source (S) terminals respectively connected to the capacitor 46 and to an isolation circuit 52 controlling discharge of the capacitor 46 through the load 24. The gates of both transistors 48, 50 are tied to the common terminal 20, which is referenced to the DC power supply terminal 38 through a dropping resistor 54. The transistors 48 and 50 are respectively P and N channel unipolar devices which act as ideal switches in the present invention in that there is no constant offset voltage across the conduction channel when the transistor is enabled. As a result of this circuit configuration, it is seen that the achievement of a high or positive voltage level by the input signal results in the transistor 48 being forward biased into conduction while the transistor 50 is reverse biased into a pinch-off or non-conducting condition, in which case the capacitor 46 is charged through the transistor 48 to the full reference voltage developed across the diode 34 while isolated by transistor 50 from the load 24. The achievement of a low or negative voltage by the input signal $V_{in}$ simultaneously enables and disables the second and first transistors 50, 48 respectively so as to transfer the charge from the capacitor 46 to the load 24 while isolating the capacitor 46 from the reference terminal 44.

It is an important feature of the present invention that the load 24 is connected to the first or lowest voltage reference terminal 40. So long as the voltage at the second reference terminal 42 is higher than the voltage level at the output terminal 30, the same amount of charge is accumulated on the capacitor 46 and transferred to the load 24 during each input cycle. For this reason, the potential difference between the first and second reference terminals is preferably maintained at a value exceeding the potential drop across the zener diode 34. The field effect transistor 48, in contrast to a conventional bipolar transistor, presents no constant offset voltage through its conduction channel and allows the capacitor 46 to charge up to the full potential difference between the terminals 42 and 44.

To insure that the charging time for the capacitor 46 remains constant at all times and to prevent a reverse charge from accumulating on the capacitor, the discharge path for the capacitor includes a switching device or isolation circuit 52 with a gate constituted by a third field effect transistor 56 having a drain (D) to source (S) conduction channel in series with the load 24. The gate terminal of the field effect transistor 56 is connected through a zener diode 58 to the output 60 of a high-drain operational amplifier 62. The amplifier 62 has inverting and non-inverting input terminals 64, 66 respectively connected to the second reference terminal 42 and to the load side of the transistor 50. As such, the amplifier 62 is operative to enable the gate 56 during discharge of the capacitor 46 and to disable the gate 56, and therefore isolate the electrical load 24 from the capacitor 46, when the capacitor 46 becomes fully discharged. This prevents the capacitor 46 from charging in the opposite direction, which would otherwise occur due to the fact that the load 24 is connected to the lowest potential reference terminal 40. To insure that the transistor 56 remains non-conducting during periods when the capacitor 46 is not discharging, the anode of the zener diode 58 is referenced to ground through a resistor 70. Also, a resistor 72 is shown in the discharge path for the capacitor 46 for controlling the discharge time.

From the foregoing detailed description, the operation of the circuit should now become apparent. As the voltage level of the input signal at terminal 10 rises above the ground potential at the terminal 12, the transistor 14 is biased into hard conduction and the voltage at the terminal 20 falls rapidly. Since the transistors 48 and 50 act in a complementary manner, the transistor 48 becomes forward biased into conduction by the voltage developed across the resistor 54, while the transistor 50 is reverse biased into non-conduction. As a result, the capacitor 46 charges to the voltage existing across the zener diode 34 in the reference circuit. The value of the capacitor 46 is selected to be small enough to allow full charging during the positive portion of each cycle of the input signal $V_{in}$. When the voltage level of the input singal $V_{in}$ at the terminal 10 goes negative with respect to the voltage at the terminal 12, the transistor 14 becomes cut off and the voltage at the terminal 20 rises to the positive supply voltage at the terminal 38. As a result, the transistor 48 is biased into non-conduction while the transistor 50 becomes forward biased into full conduction to provide a discharge path through the resistor 72 for the capacitor 46. To the capacitor 46 the input terminal 66 of the operational amplifier 62 appears to be residing at the second voltage level. As a result, discharge begins through the resistor 72. However, the amplifier 62 responds to the signal at its input to provide a high voltage signal at its output 60 which is sufficiently higher than the limiting voltage of the zener diode 58 to bias the transistor 56 into conduction, thereby connecting the load 24 in circuit with the discharging capacitor 46. Since the load 24 is connected to the lowest voltage reference terminal 40, the charge on the capacitor 56 is transferred to the load 24 rather than being dissipated in the operational amplifier 62. As the capacitor 46 becomes fully discharged, the input signal to the amplifier 62 disappears. As a result, the voltage at the output 60 of the amplifier 62 falls so that transistor 56 is biased into non-conduction, preventing further discharge of the capacitor 46 and isolating the load 24.

If the time constant of the load 24, as determined by the values of the filtering capacitor 28 and the resistance 26, is long with respect to the period of the input signal, the output signal $V_{out}$ appears as a DC voltage proportional to the frequency of the input signal $V_{in}$. The relationship between the output signal $V_{out}$ and the frequency of the input signal will remain linear, as depicted by the curve of FIG. 2, so long as the output signal voltage $V_{out}$ does not exceed the voltage at the second reference terminal 42.

The advantage derived from using a field effect transistor for each of the gates 48, 50 and 56 becomes apparent when one considers the operation of the circuit under termperature variations. Since the field effect transistor acts as a perfect switch with no constant offset voltage to be affected by temperature, a constant amount of charge is accumulated on the capacitor 46 and transferred to the load 24 irrespective of the temperature, the only limitation being the temperature stability of the principal voltage reference, the zener diode 34, and the capacitor 46. By using a temperature-stable zener diode, the circuit is made essentially insensitive to temperature variations. Additionally, since the load 24 is supplied only from the discharging capacitor 46, and since the charge transferred from the capacitor 46 remains constant for each input cycle, power supply variations have no effect on the output signal $V_{out}$.

It is an important feature of the present invention that the basic conversion circuit described above may be used with loads other than the resistive-capacitive arrangement shown in FIG. 1 without affecting the ability to deliver a constant amount of charge during each cycle of the input signal.

FIG. 3 illustrates the operation of the circuit by showing the output signal $V_{out}$ for a) the capacitive-resistive (R-C) load of FIG. 1, b) a purely capacitive load and c) a purely resistive load. These waveforms are idealized (e.g. no ripple is shown on the signal corresponding to the R-C load) to represent the achievable results generally and plotted on a common time base with the input signal $V_{in}$. For the R-C load it is seen that the output voltage $V_{out}$ is a DC level which is proportional to the frequency of the input $V_{in}$, so that when the frequency of the input doubles, as shown at 80, the DC level $V_{out}$ similarly doubles, as shown at 82. With a purely resistive load, the output signal $V_{out}$ takes the form of pulses having a constant area, the frequency of the output pulses doubling (84) when the frequency of the input $V_{in}$ doubles (80).

When a purely capacitive load is employed, the conversion circuit of the present invention functions as a pulse counter, with the output signal $V_{out}$ having a magnitude corresponding to the number of pulses received. Additional circuitry may be provided to detect when the voltage $V_{out}$ is approaching the reference voltage at the terminal 42 so that the capacitive load may be discharged and the discharged event noted in a manner well known to those skilled in the art. As shown in FIG. 3, the voltage $V_{out}$ rises in stepping sequence with each input pulse, the general slope of the rising wave varying in proportion of the input frequency as can be seen at 86 where the slope doubles in response to a doubling (80) of the frequency of the input $V_{in}$.

From the foregoing it can be seen that there has been brought to the art a signal conversion circuit which is capable of developing pulses having a constant charge content for delivery to a load in response to each cycle of an alternating input signal, the charge content of the pulses being independent of power supply and temperature variations as well as being independent of the nature and magnitude of the electrical load. As such, the circuit is particularly suitable as a frequency-to-voltage converter and additionally adaptable to a variety of other signal conversion applications.

I claim as my invention:

1. In a signal conversion circuit for receiving an input signal which alternates between first and second voltage levels, the combination comprising
   a source of DC voltage,
   a reference control circuit connected across said DC source and having first, second and third reference terminals providing successively higher and generally constant DC voltage levels,
   a capacitor having one end coupled to said second reference terminal,
   first gating means selectively coupling the other end of said capacitor to said third reference terminal,
   a two-terminal electrical load having one terminal thereof coupled to said first reference terminal,
   second gating means selectively coupling the other terminal of said load to said other end of said capacitor,
   control means responsive to said input signal for
   a. enabling and disabling said first and second gating means respectively in response to the achievement of said first voltage level by said input signal to allow said capacitor to be charged while isolated from said load and
   b. enabling and disabling said second and first gating means respectively in response to the achievement of said second voltage level by said input signal so as to transfer the charge from said capacitor to said load.

2. In a signal conversion circuit, the combination according to claim 1 wherein said reference control circuit includes a temperature-stable zener diode for establishing a constant DC potential between said second and third reference terminals so that said capacitor charges to the same potential during each cycle of said input signal.

3. In a signal conversion circuit, the combination according to claim 1 further including third electronic gating means coupling said load to said second electronic gating means and means responsive to the discharged condition of said capacitor for disabling said third electronic gating means.

4. In a signal conversion circuit the combination according to claim 3 wherein said means for disabling said third electronic gating means comprises an operational amplifier having
   a. a pair of input terminals connected in series with said capacitor and said second electronic gating means, and
   b. an output terminal controlling said third electronic gating means.

5. In a signal conversion circuit, the combination according to claim 1 wherein said first and second electronic gating means are complementary field effect transistors, the gate terminals of which are connected together and coupled to said control means, and wherein said control means is responsive to said input signal to provide a gating control signal which alternates between the voltages at said first and third reference terminals.

6. In a signal conversion circuit for receiving an input signal which alternates between first and second voltage levels, the combination comprising
   first, second and third reference terminals providing successively higher and generally constant DC voltage levels,
   a capacitor having one end coupled to said second reference terminal,
   a two-terminal electrical load having one terminal coupled to said first reference terminal, and
   switching means coupled to the other end of said capacitor and responsive to said input signal for alternating connection of said capacitor between said third reference terminal and the other terminal of said load in accordance with changes of said input signal between said first and second voltage levels so that during each cycle of said input signal said capacitor is alternately charged and then discharged into said electrical load.

7. In a signal conversion circuit, the combination according to claim 6 wherein said switching means comprises unipolar transistors between said third reference terminal and said load and between said capacitor and said load so that the amount of charge delivered to said load during each cycle of said input signal is independent of temperature variations.

8. A signal conversion circuit as set forth in claim 6 further including electronic gating means interposed between said switching means and said other terminal of said load, and amplification means having input terminals interposed between said switching means and said second reference terminal, said amplification means including means for supplying an enabling signal to said gating means while said switching means is conditioned to discharge said capacitor but terminating said enabling signal when the capacitor is fully discharged.

9. In a signal conversion circuit for receiving an input signal which alternates between first and second voltage levels, the combination comprising
   first, second and third reference terminals providing successively higher and generally constant DC voltage levels,
   a two-terminal charge accumulating device having one terminal coupled to said second reference terminal, a first gating means selectively coupling the other terminal of said charge accumulating device to said third reference terminal, a two-terminal electrical load having one terminal coupled to said first reference terminal, second electronic gating means selectively coupling the other terminal of said load to said other terminal of said charge accumulating device, and control means responsive to said input signal for
a. enabling and disabling said first and second gating means respectively in response to the achievement of said first voltage level by said input signal to allow said charge accumulating device to be charged while isolated from said load and
b. enabling and disabling said second and first gating means respectively in response to the achievement of said second voltage level by said input signal so as to transfer the charge from said accumulating device to said load.

10. In a signal conversion circuit, the combination according to claim 9 wherein said two-terminal electrical load is a resistance-capacitance parallel circuit having a time constant which is long with respect to the period of said input signal so that the DC voltage across said load is proportional to the frequency of said input signal.

11. In a signal conversion circuit, the combination according to claim 9 wherein said two-terminal electrical load is a purely resistive load so that the signal developed across said load in response to said alternating input signal is in the form of electrical pulses having a constant time-amplitude product.

12. In a signal conversion circuit, the combination according to claim 9 wherein said two-terminal electrical load is a purely capacitive load so that the alternating input signal produces a voltage across said capacitive load which steps to successively higher levels with each cycle of said input signal.

* * * * *